(12) United States Patent
Goff

(10) Patent No.: US 9,795,112 B2
(45) Date of Patent: *Oct. 24, 2017

(54) ANIMAL LITTER HAVING LIGHT-WEIGHT COMPOSITION

(71) Applicant: QUALITY LOGISTICS SYSTEMS, INC., Dallas, TX (US)

(72) Inventor: James Norman Goff, Addison, TX (US)

(73) Assignee: HEALTHY HAPPY PETS, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/868,831

(22) Filed: Sep. 29, 2015

(65) Prior Publication Data

US 2016/0014993 A1 Jan. 21, 2016

Related U.S. Application Data

(63) Continuation of application No. 13/771,443, filed on Feb. 20, 2013, now Pat. No. 9,144,224.

(51) Int. Cl.
*B01J 20/32* (2006.01)
*A01K 1/015* (2006.01)
*B01J 20/24* (2006.01)

(52) U.S. Cl.
CPC .......... *A01K 1/0155* (2013.01); *A01K 1/0152* (2013.01); *A01K 1/0154* (2013.01); *B01J 20/24* (2013.01)

(58) Field of Classification Search
CPC .................................. B01J 20/32; B01J 20/26
USPC .......................... 502/402, 407, 410, 412, 526
See application file for complete search history.

(56) References Cited

U.S. PATENT DOCUMENTS

| | | |
|---|---|---|
| 4,326,481 A | 4/1982 | Gruss |
| 4,622,920 A | 11/1986 | Goss |
| 5,143,023 A | 9/1992 | Kuhns |
| 5,267,532 A | 12/1993 | Franklin et al. |
| 5,359,960 A | 11/1994 | Yananton |
| 5,371,054 A | 12/1994 | Pluta et al. |
| 5,655,480 A | 8/1997 | Steckel |
| 5,685,259 A | 11/1997 | Santioemmo et al. |
| 5,780,385 A | 7/1998 | Santioemmo et al. |
| 5,830,765 A | 11/1998 | Santioemmo et al. |
| 5,900,379 A | 5/1999 | Noda et al. |
| 6,063,637 A | 5/2000 | Arnold et al. |
| 6,101,978 A | 8/2000 | Steckel |
| 6,177,070 B1 | 1/2001 | Lynch |
| 6,308,658 B1 | 10/2001 | Steckel |
| 7,307,053 B2 | 12/2007 | Tasz et al. |
| 9,144,224 B2 * | 9/2015 | Goff ..................... A01K 1/0154 |
| 2005/0245393 A1 | 11/2005 | Herfert et al. |
| 2008/0087226 A1 | 4/2008 | Steckel et al. |
| 2008/0145289 A1 | 6/2008 | Puvvada et al. |

* cited by examiner

*Primary Examiner* — Edward Johnson
(74) *Attorney, Agent, or Firm* — Munck Wilson Mandala, LLP

(57) ABSTRACT

Disclosed are compositions of matter and a method of manufacturing that may be used to create animal litter that detects health conditions with feline animals. For example, feline urine detection may be performed by color generation when a feline animal urinates on the litter composition. The color generation properties of the litter may be used to indicate diabetic conditions, and urinary tract infections. The litter may be highly absorbent and efficient for waste removal purposes.

10 Claims, No Drawings

ANIMAL LITTER HAVING LIGHT-WEIGHT COMPOSITION

CROSS-REFERENCE TO RELATED APPLICATIONS

This application is a continuation of U.S. patent application Ser. No. 13/771,443, filed Feb. 20, 2013, published on Aug. 21, 2014, as U.S. Publication No. 2014-0230738, now U.S. Pat. No. 9,144,224, issued on Sep. 29, 2015, entitled ANIMAL LITTER HAVING LIGHT-WEIGHT COMPOSITION AND A PROPERTY OF DETECTING ANIMAL HEALTH CONDITIONS FROM CONTACT WITH ANIMAL URINE, the specification of which is incorporated by reference herein in its entirety.

This application is related to U.S. Pat. No. 5,655,480, entitled "ANIMAL CONTROL LITTER" issued on Aug. 12, 1997, U.S. Pat. No. 6,101,978 issued on Aug. 15, 2000 entitled "ANIMAL LITTER HAVING THE PROPERTY OF DETECTING URINARY INFECTION IN CATS", U.S. Pat. No. 6,308,658 issued on Oct. 30, 2001 entitled "ANIMAL LITTER HAVING THE PROPERTY OF DETECTING URINARY INFECTION IN FELINES", and U.S. Pat. No. 7,533,630 issued on May 19, 2009, entitled "ANIMAL LITTER HAVING THE PROPERTY OF DETECTING DIABETES IN FELINES", each of which are hereby incorporated by reference in their entireties.

TECHNICAL FIELD

This application relates to a composition of matter and a method of manufacturing the composition of matter, and more specifically to a composition of animal litter granules that are optimally absorbent, light-weight and which indicate to the animal owner when the animal has a health condition via a change in color from contact with the animal's urine.

BACKGROUND

Because of the growing number of domestic animals, particularly cats, used as house pets, there is an increasing need for a simple indicator to inform the pet owner of the presence of elevated urinary infection in animals, diabetes or other illnesses so that curative steps can be taken to avoid serious illness in the animal.

Previous efforts to create a cat litter with an optimal liquid absorbency, and color changing properties included within the granules of litter matter, have often been challenging during the manufacturing process. For example, if the granules are too light the cat may become uncomfortable when stepping on them to urinate. Also, the color changing properties may create false positives when a color change is presented that is not truly indicative of a cat with diabetes, or a cat with a urinary tract infection. For example, a cat may become nervous or alarmed, begin a new diet or undergo a different change that causes the urine to elevate in its pH levels, and in turn create a false positive. Such instances may be normal and should not be necessary indications that the cat needs to be examined by a veterinarian. Therefore, the precision with which the litter changes color when exposed to urine should be carefully manufactured to only indicate when the cat truly needs to be examined for health concerns.

The ideal cat litter would indicate via color change when the cat has developed diabetes, a urinary tract infection, and would also be highly-absorbent to form solid dry and easily removable cake-like masses when exposed to the cat urine.

SUMMARY

One embodiment of the present application may include a composition of matter that includes 70-90 percent by weight light weight aggregate, 7-10 percent by weight polymer, 1.0-2.0 percent by weight process water, and 8-10 percent by weight oil.

Another embodiment of the present application may include a composition of matter with 77-83 percent by weight process water, 12-14 percent by weight surfactant, 3-4.5 percent by weight quaternary ammonium chloride compound, 0.5-1.5 percent by weight glyoxal, 0.5-1.5 percent by weight hydrochloric acid, and 0.2-2.0 percent by weight color reagent.

DETAILED DESCRIPTION

It will be readily understood that the components of the present application, as generally described in the disclosure, may be arranged and designed in a wide variety of different configurations. Thus, the following detailed description of the embodiments of a composition of matter and a method of manufacturing said composition, as represented in the following disclosure, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, function, operation, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Cats are susceptible to Haematuria (blood in urine). One in 20 cats will contract feline lower urinary tract disease (FLUID) in their lifetime and/or diabetes. One in 50 cats contract feline diabetes. The number one reason cats are brought to the Veterinarian clinic is due to inappropriate litter box behavior, which is a major symptom of FLUID. Cat owner ignorance to the symptoms of FLUID is common.

FLUID is a serious disorder that affects the urinary bladder or urethra of cats. It is known that less than half of cat owners take their cats to a veterinarian for urinating outside of the litter box, which is a known warning sign of FLUID. Besides inappropriate elimination, additional warning signs of FLUID, such as straining to urinate, urinating more frequently and/or cats crying out when urinating, can be misinterpreted as "behavioral problems," often sending cats to shelters rather than to the veterinarian for the care they require. Inappropriate elimination of these problems are also the number one behavioral reason why cat owners relinquish their cats to animal shelters. If cat owners were more educated about FLUID or more aware of its onset, this number would decrease and owners would first seek proper treatment to improve their cat's quality of life before surrendering their pets to the shelter.

Example embodiments of the present application provide a color indicating litter that exhibits a color change when urine having an abnormally high pH is brought into contact with the litter. This approach permits detection of the early signs of FLUID, which can save the cat's life.

According to example embodiments of the present application there is provided an animal litter comprised of a liquid absorbent aggregate that has been treated with an agent to visually indicate the presence of urinary infection and/or diabetes in cats. The presence and the degree of infection are represented by the degree of alkalinity of the urine. Thus, by impregnating the litter with a litmus-like material, such as, for example as phenolsgullonephthalein, a pet owner can, by observing the coloration of clumped litter containing the urine, immediately determine whether or not the pet has a urinary infection. If so, the pet may then be taken to a vet for treatment. The litmus material is available under such trade names as Phenol Red, Sodium Golf or Reagent ACS Indicator.

The present application is effective with all known animal litters, among them being various light weight aggregates, such as perlite and vermiculite compositions or other pH neutral aggregates. The litmus material, available in granule form may be heated and dissolved and well mixed with a liquid absorbent aggregate to coat the surfaces of the aggregate granules. Preferably, the litmus granules are melted at temperatures at about 212 degrees F. to form a liquid which is sprayed upon the aggregate. The animal litter of the present application is a composition comprised of a liquid absorbent aggregate impregnated with an agent for detecting urinary tract infection in cats. The results of the litmus mixing are likely to not be uniform and may be erratic throughout the distribution process.

The litmus coated granules react to the alkalinity of the cat urine to change color to indicate the presence and the severity of a urinary tract infection. The color changes related to the pH of the urine is as follows: pH factor of 7.0, color is pink or non-existent, pH factor of 7.5, color is beginning to turn pink or reddish, pH factor of 8.0, color is blood red. All colors in this example indicate the potential presence of a urinary tract infection. Although, it is normal for a cat to create urine that exceeds a pH factor of 7.0 sometimes. Generally, a pH factor of 7.4 or above is indicative of an infection. However, the mere presence of some pink or red color may act as a warning sign that the owner may monitor closely for increased health degradation in the near term and increasing levels of red color in the urine contacted litter. Should the blood red or dense color be observed, the pet owner should immediately take steps to cure the condition. In fact the presence of any of the colors should give rise to more frequent monitoring or a vet visit for treatment to the animal.

The preferred litter may be a perlite and/or vermiculite based substance. A preferred litter incorporating features of the present application may also include an expanded light weight aggregate, a clumping agent, a surfactant and an odor control agent. The composition is dust free, light weight and entirely organic. When the time comes, a clumped mass is scooped from the dry litter and flushed down the commode.

The light weight aggregate is selected from the class including perlite, vermiculite, herculite, rice hulls and zeolite. Perlite is one type of preferred aggregate. The perlite may then be expanded to provide porous surfaces by heating the perlite to 1800 degrees F. The clumping agent is a polymeric viscosity modifier. In order to enable the litter composition to agglomerate into a mass upon contact with animal urine, the clumping agent is mixed with the litter composition, preferably in an amount ranging from about 1 percent to about 10 percent by weight of the litter composition.

The surfactant, may be an alkylphenol ethoxylate, such as Tomdaol 1-5, however, other varieties of surfactants, such as other grades of Tomadol may also be used. The surfactant adds the property of anti-tracking to the composition to reduce the carrying of portions of the composition from the litter box to other areas of the household.

The odor control agent is proprietary to the supplier who maintains it as a trade secret. Odor control agents may be Cationics and Glyoxal. The agent is colorless and odor free. It performs the function of odor elimination, not as a coverup, such as a fragrance, which can be repulsive to cats, but prevents the formation of the ammoniacal odors.

One example formulation of the animal control litter may be as follows: 89.1 percent by weight of expanded aggregate, 00.4 percent by weight of odor control agent 07.0 percent by weight of clumping agent, 03.0 percent by weight of surfactant, and 00.5 percent by weight of phenolsgullonephthalein.

The composition is prepared by mixing the above components in the percentages given in a mixing apparatus which causes the odor control agent, the surfactant and the clumping agent to enter and to fill the pore in the expanded aggregate. The mixing device may cause rotations sufficient to assure that each particle of expanded aggregate is uniformly coated. Although a uniform coating is not likely, the effort to coat uniformly is maintained.

In the alternative, a liquefied litmus is sprayed upon the mixed components in lieu of using crushed litmus granules the resulting powder of which is mixed with the other components in the blender or mixer. The composition is packaged for shipment in sealed bags which have been placed in cardboard shipping containers or pails so that the vibrations encountered in shipping do not cause the components to separate or to dry out any component.

According to other embodiments, animal litters may include compositions that include a liquid absorbent aggregate impregnated with an agent for detecting glucosuria in cats. The indicator material reacts to sugar in the cat's urine to change the color of the litter where the cat has voided to indicate to the pet owner the presence of or potential presence of diabetes. In one variation the glucosuria indicator is anthrone (9,10-dihydro-9-oxoanthracene). In another variation, the glucosuria indicator may be glucose oxidase used with one or more hydroxide reactive reagents that change color when oxidized. In one variation the hydroxide reactive reagents include a peroxidase and a potassium iodide chromogen. When a litter composition using a glucose oxidase indicator is contacted with sugar containing urine, the glucose oxidase catalyzes the formation of gluconic acid and hydrogen peroxide from the oxidation of glucose. A second enzyme, the peroxidase, catalyzes the reaction of hydrogen peroxide with potassium iodide chromogen to oxidize the chromogen to colors ranging from blue through greenish-brown, and brown to dark-brown. The color change of the portion of the litter composition contacted with sugar containing urine is visibly detectable.

In one variation, an animal litter incorporating features of the present disclosure include an expanded light weight aggregate, a clumping agent, a surfactant, an odor control agent and the glucosuria indicator. The composition is dust free and light weight. The animal litter includes a clumping agent so that after use, a bioclumped mass including the animal's urine may be scooped from the dry litter and flushed down the commode. The composition includes glucosuria indicator coated granules that react to sugar in the cat's urine and change color to indicate the possible presence of a diabetic condition. If the indicator is anthrone, the color of the litter may change to a bluish shade. If such a color change is detected, the pet owner should immediately take the cat for examination and treatment by a veterinarian.

According to one example, a light weight aggregate used in the formulation of the litter is selected from a class that includes perlite, vermiculite, herculite rice hulls, and zeolite. In one variation, perlite is the selected aggregate. Perlite is expanded to provide a light weight aggregate having porous surfaces by heating to approximately 1800 degrees F. In one embodiment, the aggregate may be from about 83 percent to about 93 weight percent of the litter composition.

Due to variations in raw materials, the color of the aggregate used in the formulation of the litter compositions described herein may vary. Consequently, glucosuria indicators used with the litter compositions should react with sugar in the urine of an animal using the litter in a manner to generate a change in color that is distinguishable from the color of the aggregate (whether wet or dry). In the case of perlite, the normal color may vary from white to a pale yellow grey. Hence, glucosuria indicators used in the compositions including perlite should generate a color on contact with sugar containing urine different from the normal white to pale yellow grey and with sufficient intensity to be visually detectable.

In order to enable the litter composition to agglomerate into a mass upon contact with animal urine, a clumping agent is mixed with the litter composition, preferably in an amount ranging from about 1 percent to about 10 percent by weight of the litter composition. In one embodiment, the clumping agent is a polymeric viscosity modifier, such as a guar gum or derivatized guar. Surfactants such as alkylphenol ethoxylates may be employed. The surfactant adds the property of anti-tracking to the composition thus preventing the carrying of portions of the composition from the litter box to other areas of the household. In one embodiment, the surfactant comprises from about 0.5 to about 5.5 weight percent of the litter composition. Also included in the litter composition is an odor control/antistatic agent. In one embodiment, the odor control/antistatic agent may be any control agent or quaternary ammonium chloride compound in one example. The odor control agent performs the function of odor elimination by blocking odor producing oxidation of decomposing organic matter and/or by complexing airborne odor molecules. The odor control/antistatic agent performs the function of odor elimination, not as a cover-up, but in the prevention of the formation of the ammonical odors. In one embodiment, the odor control/antistatic agent includes from as little as 0.2 weight percent to about 2.5 weight percent of the litter composition.

In one variation, formulations of animal litters according to the present disclosure may be as follows: 88.1 percent +/−5.0 percent by weight of expanded aggregate; 00.9 percent +/−0.7 percent by weight of odor control/antistatic agent; 07.0 percent +/−4.0 percent by weight of clumping agent; 03.0 percent +/−2.5 percent by weight of surfactant; and 01.0 percent +/−0.90 percent by weight of a glucosuria indicator.

In another variation, a selected composition includes: 88.6 percent by weight of expanded aggregate; 00.9 percent by weight of odor control/antistatic agent; 07.0 percent by weight of clumping agent; 03.0 percent by weight of surfactant; and 00.5 percent by weight of a glucosuria indicator.

In one embodiment, a glucosuria indicator solution is prepared by dissolving the glucosuria indicator in the surfactant and a suitable non-ionic solvent such as oil or liquid paraffin. After the indicator is dissolved, the indicator is applied to the aggregate in a manner to insure adequate dispersion and coverage of the aggregate granules. In one variation, the glucosuria indicator solution is sprayed onto the aggregate. The animal litter composition is prepared by mixing the above-listed components in sufficient quantity to make 100 weight percent in a mixing apparatus which causes the odor control/antistatic agent, the glucosuria indicator solution and the clumping agent to enter and to fill the pores in the expanded aggregate. The mixing apparatus may be used to provide multiple folds per revolution during the mixing process. A suitable mixing apparatus is a rotational drum type mixer. The mixing apparatus rotates at 4 RPM or faster. Each revolution provides six folds in the mixing action to assure that the particles of expanded aggregate are adequately coated with the odor control/antistatic agent, the glucosuria indicator solution and the clumping agent.

When a feline having glucosuria urinates on animal litter compositions as disclosed herein the litter contacted by the urine will change color so as to be distinguishable from the remainder of the litter, indicating the presence of sugar in the urine. In one embodiment, the normal color of the litter compositions will vary from a pale yellow-grey to white. In the compositions including anthrone as a glucosuria indicator, when contacted with sugar-containing urine, the color of the contacted litter may change to a bluish color, or assume a bluish hue, having sufficient intensity to enable visual detection of the color change. The exact color change and the intensity of the color change may vary depending including the exact composition of the litter, the amount of sugar in the urine, variations in raw materials and other factors, however, the change will be sufficient to enable a user to visually distinguish litter contacted with sugar containing urine from the remainder of the litter, i.e., non-contact portions and/or portions contacted by urine not containing sugar.

The composition is packaged or shipped in sealed containers which have been placed in cardboard shipping containers or pails so that the vibration encountered during shipping does not cause the components to separate. The sealed containers also prevent any of the components from drying out during transit or storage.

A method of identifying the presence of sugar in the urine of felines and other related species includes the steps of providing a litter composition to be used by the feline for the purpose of urination thereon. Where the feline is a house pet, the litter composition is typically made available to the feline in a litter box placed in an unobtrusive area. In other cases the litter may be provided in a container or on the floor of a cage or similar enclosure in which the feline is restrained for the purpose of determining whether the animal has glucosuria or for other reasons.

The litter composition utilized in the method generally includes a major portion of an expanded aggregate and minor portions of an control/antistatic agent, a clumping agent, a surfactant and a glucosuria indicator. As used herein, a major portion is greater than 80 weight percent and a minor portion is less than 10 weight percent. In other variations, the method utilizes compositions having the formulations set forth above. After the feline urinates on the litter composition, whether in a litter box or in an enclosure, the composition is visually observed for a color change. A change in the color of the urine-contacted litter that is visually distinguishable from the color of the non-contacted litter or litter contacted by non-sugar containing urine may indicate the presence of sugar in the feline's urine. Upon observing a distinguishable color change, the owner may wish to take the feline to a veterinarian for further tests and/or treatment.

In one variation the normal color of the perlite or other appropriate aggregate used disclosed herein varies from a pale yellowish gray to white. Therefore the glucosuria indicator should change to a color distinguishable from the normal color (whether wet or dry) of the aggregate when contacted with urine containing sugar. In one variation, wherein the glucosuria indicator is anthrone, the litter composition may change to a bluish color or assume a bluish hue that is visually detectable and distinguishable from the normal color of the litter composition. In another variation, wherein the indicator is glucose oxidase used with one or more hydroxide reactive reagents, the color change may range from blue through greenish-brown, and brown to dark-brown. The exact color change may vary depending upon a number of factors; however, the portion of the litter composition contacted with sugar containing urine is visibly detectable and distinguishable from the non-contacted litter.

According to another example embodiment, the cat litter may have another composition that includes various different portions by weight. For example, one example composition may include: 45-46% by weight Perlite; 34-35% by weight Vermiculite or a combined 70-90% light weight aggregate; 7.9-8% by weight polymer (Guar); 1.9-2.0% by weight process water (i.e., DI water); 0.3-0.35% by weight non-ionic surfactant (i.e., Tomadol I-5); 0.08-0.099% by weight quaternary ammonium chloride compound; 0.01-0.02% by weight Glyoxal, 0.02-0.03% by weight hydrochloric acid (at 30-35%), 0.01-0.02% by weight reagent (Phenol red), and 8.5-8.75% by weight liquid paraffin.

Another example composition of matter may include a premix that is added to an initial aggregate. The initial aggregate is generally 88% of the final litter product. Another 8-9% of the final product is a liquid paraffin or oil for granule weighting and consistency purposes. As a result, only a small portion 2-4% of the final composition is actually designed to identify health conditions via the animal urine. For example, in this composition, 44-46% by weight of perlite and 34-36% by weight of vermiculite and 7-8.5% by weight of a polymer (guar) may be set aside as an initial aggregate and used to mix with a separate composition that is mixed and created prior to being added to the initial aggregate. The polymer may be organic and/or synthetic. For example, the final product may be 40-50 percent by weight perlite; 30-40 percent by weight vermiculite; 7-10 percent by weight a polymer; 1.0-2.0 percent by weight process water; and 8-10 percent by weight liquid paraffin.

As for the urine detection properties, that additional additive may have a composition that includes 0.01-0.09 percent by weight color reagent, 0.3-0.35 percent by weight surfactant, 0.05-0.15 percent by weight quaternary ammonium chloride compound, 0.01-0.02 percent by weight glyoxal, 0.02-0.03 percent by weight hydrochloric acid such that the hydrochloric acid is 31-35% pure. Also, the polymer may be guar.

Now referring only to the specific composition that is mixed together and later added to the aggregate, this example embodiment may include a composition of matter that includes 77-83 percent by weight process water, the process water is ionized and/or distilled water, 12-14 percent by weight surfactant, 3-4.5 percent by weight quaternary ammonium chloride compound, 0.5-1.5 percent by weight glyoxal, 0.5-1.5 percent by weight hydrocloric acid, and 0.5-1.0 percent by weight color reagent. This composition may be carefully mixed and added to a large quantity of the initial aggregate and oil or liquid paraffin may also be added to finish the litter product.

In another example, the process for creating or manufacturing the pet litter may include five separate phases. Phase one may be based on perlite, vermiculite and the guar being mixed together as an initial aggregate. The amounts of vermiculite and perlite may be weighed first and added to a mixer (i.e., blender). Thereafter, the guar may be evenly spread across the top of the vermiculite and the perlite. The blending may be conducted until the guar is evenly dispersed across the entire contents of the mixture in phase one. Next, phase two may be conducted to prepare the process water (D) for added ingredients in a separate container. Then, the surfactant (Tomadol I-5), the quaternary ammonium chloride compound, and glyoxal may each be added and agitated in the water minimally to avoid foam from forming. Also, in another example the phenol red may be added during this same phase. Once the phase is uniform, the phase three may include adding the hydrochloric acid (at 30-35%) and mixing until pH dictates 1.0 to 2.5 or provides a color change. Next, in phase four, the color reagent (phenol red) may be added and mixed into the water until dissolved until the color reagent distribution is uniform across phases two and three. Finally, phase five would require the phases two, three and four to be added to the liquid paraffin and mixed for several minutes (3-6 minutes) until homogenous and uniform mixture is obtained. The blender may then be started and the transfer pump may also be initiated to distribute the phases two, three, four and five from a stainless steel container into the blender. Another minute or two of blending will be required to distribute the phases two through five across the original phase one. A bulk density may be created based on the combination of the five phases that has a mass per unit volume of 0.165 to 0.185. A more preferred range may be 0.177 to 0.179 mass per unit volume.

Although cats are described throughout the disclosure, other litter using animals may also be subjected to the detection properties of the litter and may benefit from such urine detection properties. One having ordinary skill in the art will readily understand that the application as discussed above may be practiced with steps in a different order, and/or with compositions in configurations that are different than those which are disclosed. Therefore, although the application has been described based upon these preferred embodiments, it would be apparent to those of skill in the art that certain modifications, variations, and alternative constructions and compositions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications thereto.

What is claimed is:
1. A composition of matter comprising:
79-81 percent by weight light weight aggregate;
7.9-8.0 percent by weight polymer;
1.9-2.0 percent by weight process water; and
8.5-8.75 percent by weight oil.

2. The composition of matter of claim 1, further comprising:
　0.01-0.02 percent by weight color reagent.

3. The composition of matter of claim 1, further comprising:
　0.30-0.35 percent by weight surfactant.

4. The composition of matter of claim 1, further comprising:
　0.08-0.099 percent by weight quaternary ammonium chloride compound.

5. The composition of matter of claim 1, further comprising:
　0.01-0.02 percent by weight glyoxal.

6. The composition of matter of claim 1, further comprising:
　0.02-0.03 percent by weight hydrochloric acid.

7. The composition of matter of claim 6, wherein the hydrochloric acid is 30-35% pure.

8. The composition of matter of claim 1, wherein the polymer is guar.

9. The composition of matter of claim 1, wherein the oil is liquid paraffin.

10. The composition of matter of claim 1, wherein the light weight aggregate is comprised of:
　45-46 percent by weight perlite; and
　34-35 percent by weight vermiculite.

\* \* \* \* \*